US012731425B2

(12) United States Patent
Krishnamurthy et al.

(10) Patent No.: US 12,731,425 B2
(45) Date of Patent: Sep. 8, 2026

(54) METHOD OF CLASSIFYING A DOCUMENT FOR A STRAIGHT-THROUGH PROCESSING

(71) Applicant: UST GLOBAL (SINGAPORE) PTE. LIMITED, Singapore (SG)

(72) Inventors: Dasaprakash Krishnamurthy, Greater London (GB); José Pablo Romero Valle, Salamanca (ES); Carlos Barranquero Díez, Salamanca (ES); Miguel Roca García, Madrid (ES)

(73) Assignee: UST GLOBAL PRIVATE LIMITED, London (GB)

( * ) Notice: Subject to any disclaimer, the term of this patent is extended or adjusted under 35 U.S.C. 154(b) by 331 days.

(21) Appl. No.: 18/474,382

(22) Filed: Sep. 26, 2023

(65) Prior Publication Data

US 2024/0135739 A1 Apr. 25, 2024
US 2024/0233426 A9 Jul. 11, 2024

(30) Foreign Application Priority Data

Oct. 20, 2022 (IN) ............................ 202211060127

(51) Int. Cl.
*G06V 30/413* (2022.01)
*G06V 30/12* (2022.01)
*G06V 30/19* (2022.01)

(52) U.S. Cl.
CPC ........ *G06V 30/1916* (2022.01); *G06V 30/133* (2022.01); *G06V 30/19013* (2022.01); *G06V 30/413* (2022.01)

(58) Field of Classification Search
CPC ......... G06V 30/40–43; G06V 30/1916; G06V 30/19013; G06V 30/133
See application file for complete search history.

(56) References Cited

U.S. PATENT DOCUMENTS

2020/0320134 A1* 10/2020 Beaver ................ G06F 18/2178
2021/0149931 A1* 5/2021 Iliadis ...................... G06N 3/09
2022/0284215 A1* 9/2022 Rastogi ............... G06F 16/9024
2023/0010202 A1* 1/2023 Fujimoto ............... G06N 3/044
2023/0281821 A1* 9/2023 Pizzocchero ........ G06V 30/142
382/100

* cited by examiner

*Primary Examiner* — Sean T Motsinger
(74) *Attorney, Agent, or Firm* — CANTOR COLBURN LLP

(57) ABSTRACT

Disclosed is a method of classifying a document for a straight-through processing (STP) using memory enabled modelling. The method includes receiving, performing a content extraction from the input image, and selecting a template with the highest matching probability from a database. The method further includes postprocessing the extracted content based on the predicted template and validating the extracted content. Thereafter, the method includes classifying the document for the STP if the extracted content is successfully validated corresponding to each of the image quality validation, the refined content extraction validation, and the layout validation.

12 Claims, 8 Drawing Sheets

200
102
Document
Document To Image
202
Document Extractor Machine Learning (ML) Model
204
Prediction ML Model
206
Confidence Score (CS)
208
> pre-defined threshold CS
< a pre-defined threshold CS
Postprocessing
210
Refined Extraction
212
Final Extraction Results Validations
214
Layout Validation
216
Is Layout Valid? Is final Extraction valid? Is template an STP Candidate
218
STP Document
220
Non STP Document
222
Database 106
UI
224
HITL
226

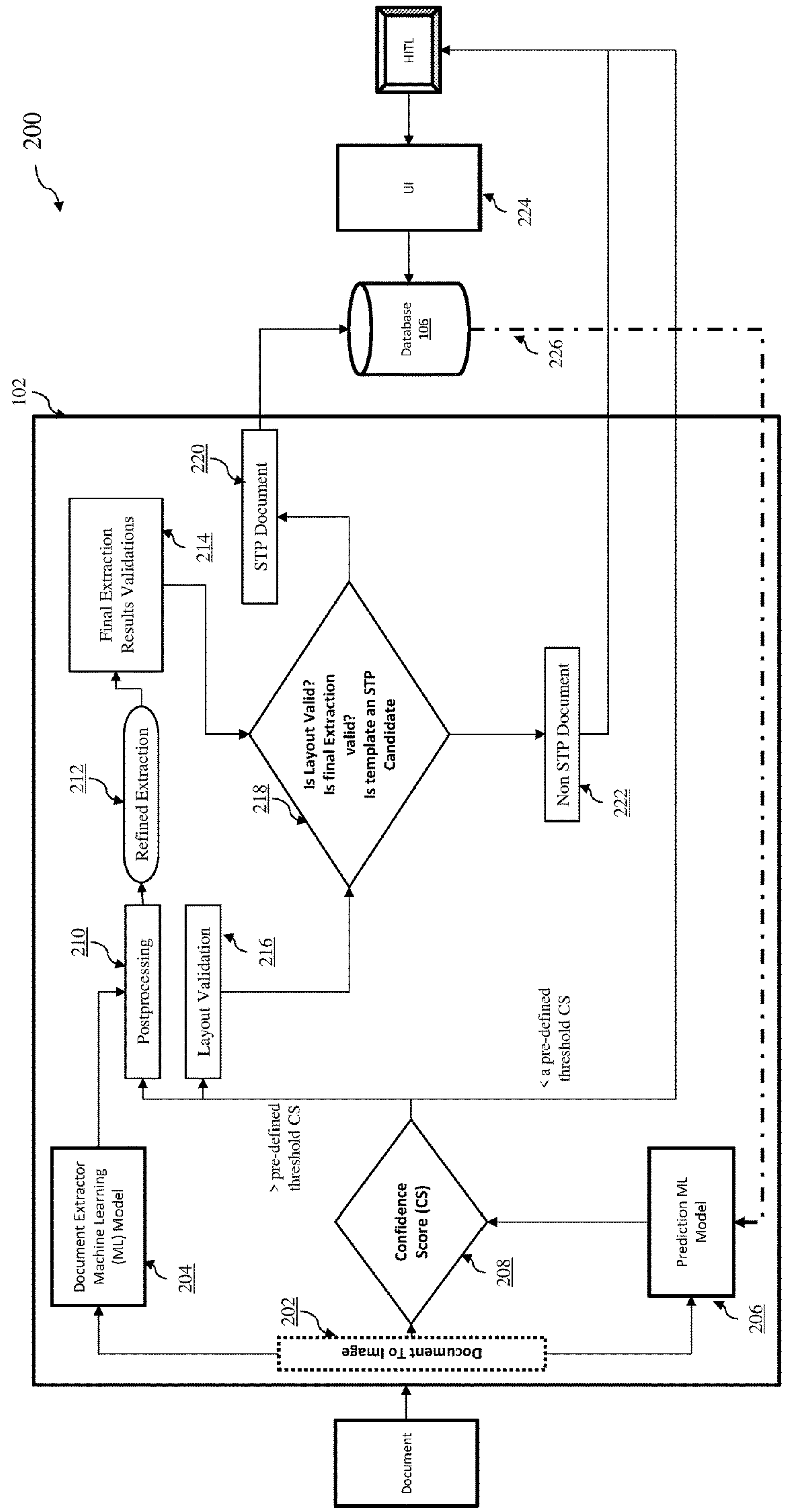

Figure 2

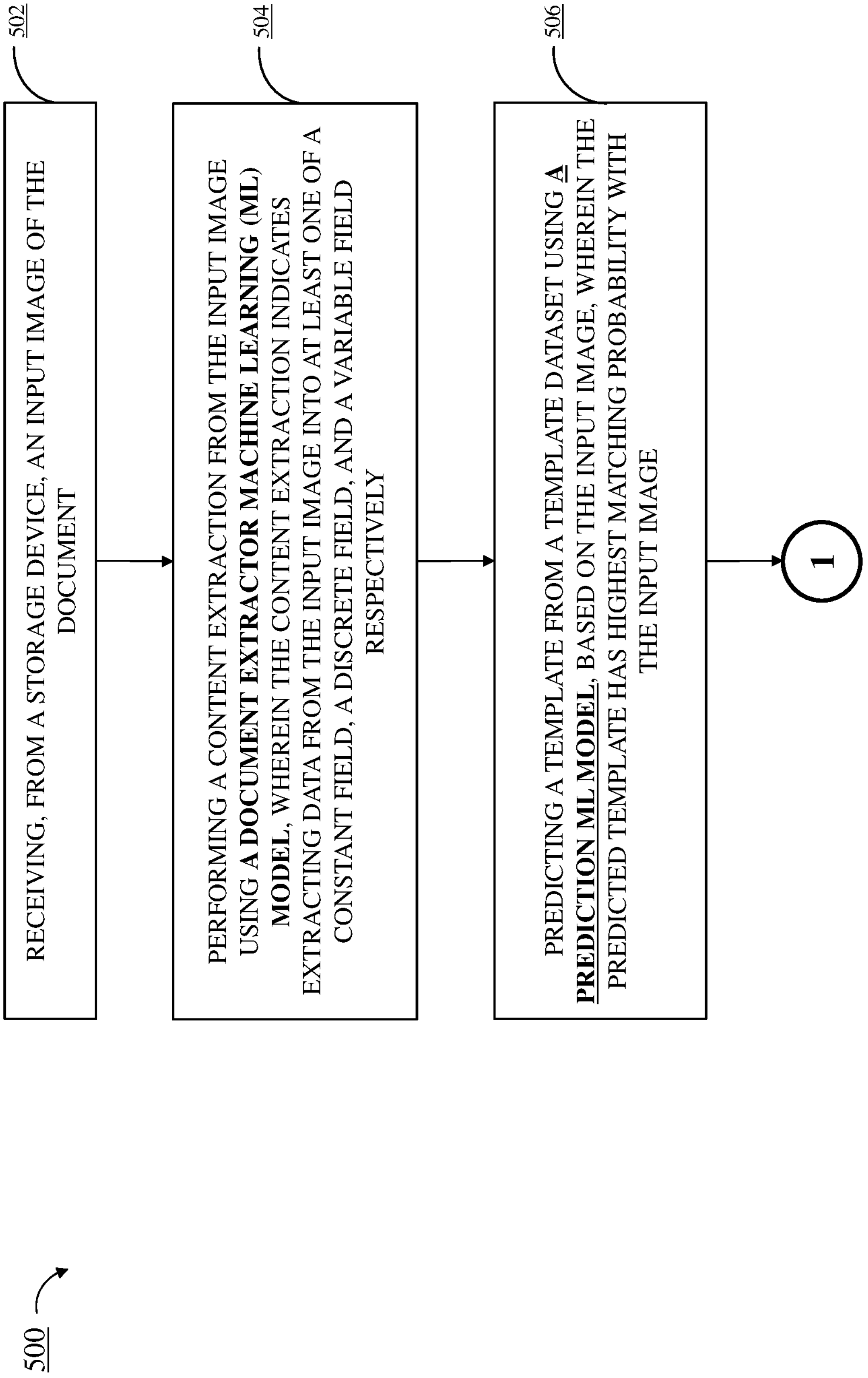

RECEIVING, FROM A STORAGE DEVICE, AN INPUT IMAGE OF THE DOCUMENT

504

PERFORMING A CONTENT EXTRACTION FROM THE INPUT IMAGE USING A DOCUMENT EXTRACTOR MACHINE LEARNING (ML) MODEL, WHEREIN THE CONTENT EXTRACTION INDICATES EXTRACTING DATA FROM THE INPUT IMAGE INTO AT LEAST ONE OF A CONSTANT FIELD, A DISCRETE FIELD, AND A VARIABLE FIELD RESPECTIVELY

506

PREDICTING A TEMPLATE FROM A TEMPLATE DATASET USING A PREDICTION ML MODEL, BASED ON THE INPUT IMAGE, WHEREIN THE PREDICTED TEMPLATE HAS HIGHEST MATCHING PROBABILITY WITH THE INPUT IMAGE

1

METHOD OF CLASSIFYING A DOCUMENT FOR A STRAIGHT-THROUGH PROCESSING

CROSS REFERENCE TO RELATED APPLICATION

This application is a Nonprovisional application, which claims priority to Indian Application No. 202211060127, filed on Oct. 20, 2022 and all the benefits accruing therefrom under 35 U.S.C. § 119, the content of which is incorporated by reference in its entirety.

TECHNICAL FIELD

The present disclosure relates generally to the field of information processing systems, and more specifically, to a method and system to classify the document as a suitable candidate for extracting data without manual intervention using memory enabled modelling.

BACKGROUND

Generally, in a corporate environment, multiple documents are received in paper form or electronic form for review, analysis, categorization, and processing purposes. Such as, vendors may send invoices, purchase orders, or a prospecting candidate may send a resume, etc.

Particularly, obtaining data from scanned images of such documents is a laborious task. For example, many documents such as invoices are delivered in paper form but must be converted into an electronically accessible form. In order to access the data electronically, manual labor is usually required to key in data from physical documents or images of such documents. Such methods are time-consuming and may be inefficient and inaccurate due to the possibility of any human error while keying in data. Therefore, document classification models were developed to extract data, for example, text data from the documents, and categorize the documents into desired classes such that the class signifies a specific type of document. For example, the document classifier may assist in identifying documents representing invoices from a pool of multiple documents. Such document classifiers as known in the art may ease to retrieve data from the invoices or any other scanned image of the document, and mark the document in a particular category.

However, conventional document classification models are inefficient in determining if the document is a suitable candidate for an automation process. Also, in view of the above-discussed problems, it is evident that the conventional document classification models require manual feature engineering which is also a major challenge to determine whether the document is a suitable candidate for the automation process.

Therefore, there lies a need for an improved document classification system and method that can overcome the above-mentioned limitations and disadvantages of the conventional document classification models.

SUMMARY

One disclosed non-limiting example is a document classification system for classifying the document as an STP document or a non-STP document may be from an invoice, and a purchase order. While the examples disclosed herein focus on documents such as invoices or purchase orders, the present disclosure is not limited to invoices or purchase order, but rather, is more broadly applicable to any image of the documents having similarly arranged information as invoices, and other documents. In the non-limiting example, the invoice can be a scanned image and can be in any format. This is especially useful in cases where the system is expected to process invoices from different vendors and hence cannot follow a standard format.

According to some implementations of the present disclosure, a method of classifying a document for a straight-through processing (STP) using memory enabled modelling is disclosed. The method includes receiving, from a storage device, an input image of the document. The method includes performing a content extraction from the input image using a document extractor machine learning (ML) model, wherein the content extraction indicates extracting data from the input image into at least one of a constant field, a discrete field, and a variable field respectively. The method includes selecting a template from a template dataset using a prediction ML model, based on the input image, wherein the predicted template has the highest matching probability with the input image. The method includes determining a confidence score by comparing the input image and the predicted template, wherein the confidence score indicates a similarity between the predicted template and the input image. The method includes postprocessing the extracted content based on the predicted template upon determining that the confidence score is more than a pre-defined threshold confidence score. The method includes validating the extracted content based on postprocessing of the extracted content, wherein the validation comprises of an image quality validation, a refined content extraction validation, and a layout validation; and classifying the document for the straight through processing if the extracted content is successfully validated corresponding to each of the image quality validation, the refined content extraction validation, and the layout validation.

According to some implementations of the present disclosure, a system of classifying a document for processing using a memory enabling model is disclosed. The system includes a memory, at least one processor communicably coupled to the memory. The at least one processor is configured to receive, from a storage device, an input image of the document. The at least one processor is configured to perform a content extraction from the input image using a document extractor machine learning (ML) model, wherein the content extraction indicates extracting data from the input image into at least one of a constant field, a discrete field, and a variable field respectively. The at least one processor is configured to predict a template from a template dataset using a prediction ML model, based on the input image, wherein the predicted template has the highest matching probability with the input image. The at least one processor is configured to determine a confidence score by comparing the input image and the predicted template, wherein the confidence score indicates similarity between the predicted template and the input image. The at least one processor is configured to postprocess the extracted content based on the predicted template upon determining that the confidence score is more than a pre-defined threshold confidence score. The at least one processor is configured to validate the extracted content based on postprocessing of the extracted content, wherein the validation comprises of an image quality validation, a refined content extraction validation, and a layout validation and classifying the document for the straight through processing if the extracted content is successfully validated corresponding to each of the image quality validation, the refined content extraction validation, and the layout validation.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 2 illustrates a flow diagram depicting a method of classifying a document for a straight-through processing (STP) using memory enabled modelling (MEM), according to an embodiment of the present disclosure;

FIG. 5 illustrates a process flow comprising sub-steps of method step of classifying the document for the STP using MEM, according to some embodiments of the present disclosure;

Figure 1:
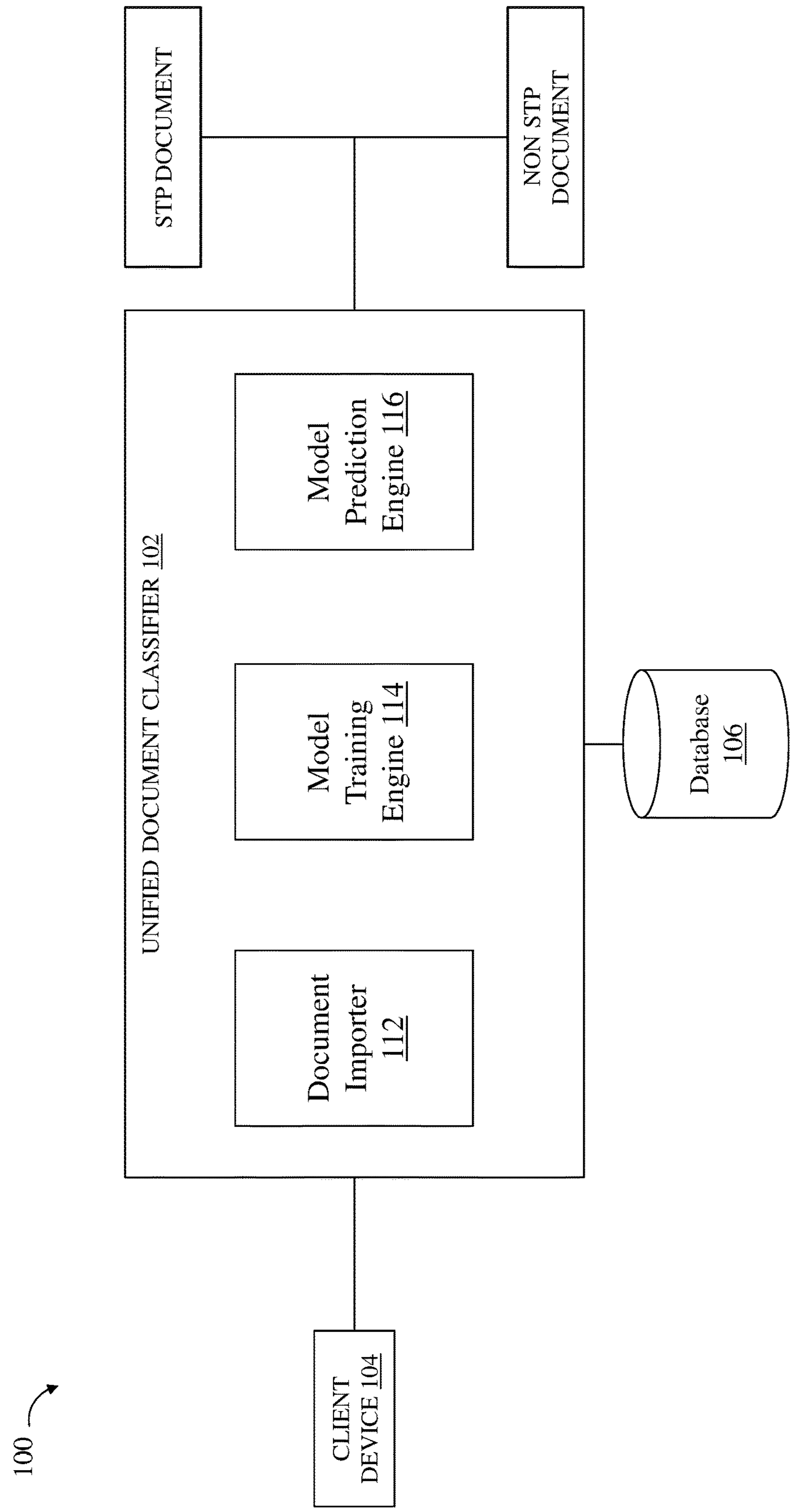
FIG. 1 illustrates a block diagram of an exemplary unified document classifier system, according to an embodiment of the present disclosure.

The present disclosure is susceptible to various modifications and alternative forms. Some representative embodiments are shown by way of examples in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present disclosures can be embodied in many different forms. Representative embodiments are shown in the drawings and will herein be described in detail. The present disclosure is an example or illustration of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a system that classifies the document as an STP document or a non-STP document based on content extraction, image quality, and other validation logics from the image of any document such as an invoice. The system may depend on reading the text in the image so that the current challenges of classifying the documents from the image are overcome. While the examples disclosed herein focus on documents such as invoices or purchase orders, the present disclosure is not limited to invoices or purchase order, but rather, is more broadly applicable to any image of the documents having similarly arranged information as invoices, and other documents.

Conventional machine learning systems for document classification have drawbacks in terms of amount of data required and availability of the required data. It is unclear how much data is required for training, and if the data available for training does not provide a good enough performance, data availability can hamper further training and hamper an accuracy of the system. Conventional machine learning systems also must consider performance (i.e., number of documents that can be processed per unit time), hardware infrastructure (i.e., speed of components of the computing systems), productivity tools (e.g., ability to receive human feedback), and amount of specific domain knowledge required. Machine learning systems geared towards a first domain are not versatile to be applied to a second domain without training the systems to handle the second domain.

Automated content extraction from documents refers to the process of automatically extracting relevant information and data from structured or unstructured documents, such as text files, PDFs, images, or scanned documents, using machine learning and natural language processing techniques. The goal is to extract structured data from unstructured sources, making it easier to analyze, organize, and utilize the information contained within the document. Generally, a process automation technique known as straight through processing (STP), aims to streamline and expedite the flow of information and transactions between different entities without human intervention in the loop (HITL) and rekeying of data. Further, it is desired to extract data from an input document automatically via STP. For instance, a vendor may recurringly send invoices as the input document, and it is desirable to extract data from the invoices at each instance. However, STP may be achieved efficiently if the input document is classified as an STP document or a non-STP document. For instance, an invoice may be input into the STP automation for document extraction. However, if the invoice is the non-STP document, it may require the HITL i.e., manual annotation of the invoice. Thus, embodiments of the present disclosure provide end-to-end document classification by using an image of the input document using memory enabled modelling (MEM), predicting a template stored in a database, and extracting content from the image based on the MEM and the template. Embodiments of the present disclosure use one-shot learning to detect the template similar to the image. Embodiments of the present disclosure use few-shot learning to train a machine learning (ML) model to extract content from the image. Few shot learning can use as few as 100 documents for training and can classify documents from different domains.

FIG. 1 illustrates a block diagram of an exemplary unified document classifier system 100 according to an embodiment of the present disclosure. To simplify the discussion, the singular form will be used for components identified in FIG. 1 when appropriate, but the use of the singular does not limit the discussion to only one of each such component. The system 100 may include a client device 104, a unified document classifier 102, and a database 106. Each of these components can be realized by one or more computer devices and/or networked computer devices. The computer devices include at least one processor with at least one non-transitory computer-readable medium.

The client device 104 is any computing device that can provide commands to or that can communicate with the unified document classifier 102 and request the unified document classifier 102 to perform classification of the document i.e., to classify the document as the STP document or the non-STP document. In an embodiment, the client device 104 may also provide the unified document classifier 102 with one or more document images for classification of the image of the document. In an example, the client device 104 may include a laptop computer, a desktop computer, a smartphone, a smart speaker, a smart television, a scanner, a PDA, etc.

The unified document classifier 102 may be in communication with the database 106 for storage of various parameters, document images, template images, and configuration data. For example, model parameters for the machine-learned model may be stored in the database 106, scanned document images may be stored in the database 106, document classification settings can be stored in the database 106, labelled data may be stored in the database 106, a predefined user configuration of the document formatting settings may be stored in the database 106, etc.

In an embodiment, the unified document classifier 102 may be a memory enabled model or a neural network, and may include a document importer 112, a model training engine 114, and a model prediction engine 116. An engine is a combination of hardware and software configured to perform specific functionality, as discussed throughout this disclosure. The unified document classifier 102 is configured to receive instructions from the client device 104 for classifying the input image of the document. In an example, the client device 104 may provide the unified document classifier 102 with the predefined user configuration. In the example, the predefined user configuration may include a pre-defined threshold confidence score, a preprocessing configuration, and a validation logic.

In an example, based on a confidence score of the input image and the template selected from the database 106, the content is extracted from the input image and is further subjected to the validation logic. In the example, the validation logic may include an image quality validation, a refined content extraction validation, and a layout validation. Thus, upon successful validation, the document may be classified for the straight through processing i.e., classified as the STP document. In another example, the document may be classified as a manual annotation or the HITL i.e., classified as the non-STP document if the extracted content is unsuccessfully validated.

In some implementations, the unified document classifier 102 does not have to know the type of document being examined. Each of the document importer 112, the model training engine 114, and the model prediction engine 116 identified in FIG. 1 is a combination of hardware and software configured to perform specific functionality as described in the following paragraphs.

In an embodiment, the unified document classifier 102 includes the document importer 112. The document importer 112 is configured to interrogate documents to be examined based on the file format. In an example, the documents may be provided in different file formats. For example, the documents can be provided in an image format (e.g., portable network graphics (PNG) format, tagged image file format (TIFF), Silicon Graphics image file (RGB), graphic interchange format (GIF), portable bitmap formats (e.g., PBM, PGM, PPM), Sun raster bitmap image file format (RAST), raster image file formats (e.g., EXR), JPEG, bitmap formats (e.g., BMP, XBM), etc.), in a video format (e.g., WebP file format), or in any other document format (e.g., portable document format (PDF), open document format (ODF), Microsoft® Word document (DOC), Microsoft® Word Open XML format (DOCX), etc.). In an example, the document importer 112 may include OCR for recognizing text in image files.

In another embodiment, the model training engine 114 trains a machine learning model using training data. The model prediction engine 116 uses the trained machine learning model to provide information in the image of the documents to the client device 104. For example, the model training engine 114 can receive training documents from the document importer 112 to train the model, and the model prediction engine 116 can receive documents from the document importer 112 for extracting information using the trained model. In an example, the model training engine 114 trains the machine learning model using a few-shot learning approach.

FIG. 2 illustrates a flow diagram depicting a method 200 of classifying the document for the straight-through processing (STP) using memory enabled modelling (MEM), according to an embodiment of the present disclosure. In an example, the steps in FIG. 2 may be implemented by the client device 104, the unified document classifier 102, or both.

At step 202, the method 200 may include the unified document classifier 102 receiving the document and preparing the input image from the document for classification using the document importer 112. In an example, the input image with dimensions of X pixels by Y pixels by Z channels may be formatted to a specific size for use by the unified document classifier 102. Further, the unified document classifier 102 may convert the input image to a machine-readable data. In an example, the document importer 112 may convert the input image of the document to the machine-readable data using an Optical Character Recognition (OCR) technique.

At step 204, the method 200 may include performing a content extraction from the input image using a document extractor machine learning (ML) model. The document extractor ML model is trained using the model training engine 114. The content extraction may indicate extracting data from the input image into a constant field, a discrete field, and a variable field respectively.

In an example, the constant field in the input image of the document may refer to specific attributes or properties that remain the same for all instances or versions of that input image. The constant fields contain fixed values that do not change and provide consistent information across a set of input images of the document. The constant fields may be used to capture metadata or static details associated with the input image. In the example, the constant field may be a document title, a document ID, a creation date vendor code, a currency, a ship to code in an invoice, a jurisdiction, a party name in contracts, and the like. In the example, the constant field may receive the content based on the template selected from the database 106. The template selection may be described in the following steps of the method.

In an example, the discrete field in the input image of the document may refer to specific attributes or properties that may take on distinct values or categories. The discrete field such as an address field may represent qualitative or categorical information within the input image of the document. The content extracted into the discrete field may be validated with the template selected from the database 106. In the example, the discrete field may receive the content based on a comparison between the extracted content from the input image and the template selected from the database 106. The template selection may be described in the following steps of the method.

In an example, the variable field in the input image of the document may refer to specific attributes or properties that may have different values or vary from one instance of the input image to another. Unlike the constant field, which has fixed values, the variable field may contain information that may be customized for each of the documents or the document instance. The variable field may capture dynamic or context-specific data within the input image of the document such as a date, a name, an amount, a signature, and the like. In the example, the variable field may receive the content based only on the extracted content from the input image.

At step 206, the method 200 may include selecting the template from a template dataset using a prediction ML model. In an example, the input image may be an input to the prediction ML model for predicting the template with the highest matching probability. Thus, the template with highest matching probability may be selected for the content extraction in the further steps. The predicted template may be hereinafter interchangeably referred to as the selected template within the scope of the disclosure. Further, the template may be selected from the template dataset prestored in the database 106. A detailed description of the template selection is explained in FIG. 4.

At step 208, the method 200 may include the unified document classifier 102 determining the confidence score by comparing the input image and the selected template. In an example, the confidence score (CS) indicates a similarity between the selected template and the input image. Thus, the confidence score may be a measure of the unified document classifier 102 confidence or certainty in prediction or a classification output.

Further, in the method 200 the determined confidence score may be compared with the pre-defined threshold configured score. The predefined user configuration provided by the client device 104 may include the pre-defined threshold configured score.

In an example, upon determining the confidence score corresponding to the input image of the document and the selected template is higher than the predefined threshold CS, the process flow may continue further for validation logic. In another example, upon determining the confidence score corresponding to the input image of the document and the selected template is lower than the predefined threshold CS, the document may be classified as the non-STP document and sent for a manual annotation i.e., the HITL.

If the template is not identified because the similarity is not higher than the threshold, it means that its template is not available in the template dataset, the document will automatically be categorized as not STP.

At step 210, the method 200 may include post-processing the extracted content of the input image in continuity with the step 204, and upon determination, the confidence score corresponding to the input image of the document and the selected template is higher than the predefined threshold CS.

In an example, post-processing the extracted content of the input image may indicate additional processing or refinement steps performed on an output of the document extractor ML model i.e., the extracted content of the input image. Post-processing may improve the quality, structure, or usability of the extracted content of the input image. Post-processing may include applying rules, algorithms, or heuristics to the document extractor ML model's outputs to address specific requirements or constraints. In the example, post-processing may be overwriting the value of the constant field (e.g., Vendor Name) or to extract the constant field known to be in certain locations of the input image of the document, correcting column mapping, fixing OCR errors, and alike.

At step 212, the method 200 may include the extracted content being refined post-processing. In an example, the refined extracted content may be stored in the database 106.

At step 214, the method 200 may include the unified document classifier 102 validating the extracted content as the output post-processing. In an example, validating the extracted content may include confirming entry into the constant field, the discrete field and the variable field, data type conditions, regular expressions, and the like.

At step 216, the method 200 may include validating the extracted content based on postprocessing of the extracted content. The validation may include the image quality validation, the refined content extraction validation, and the layout validation.

In an example, the image quality validation may include validation of a quality of the input image to be classified as the STP document. In the example, the image quality validation may be performed using a deep learning approach on the OCR of the input image as converted by the document importer 112. In the example, the input image may be classified based on an image quality such as good, medium, and bad, providing a score between 0 and 100. In the example, the image quality validation may be successful upon determining that the input image has good resolution, characters are legible, presence of little noise, correct orientation, handwritten text is clear, and alike. Further, based on the score of the image quality validation the input image may be rejected or accepted for further processing.

In an example, the refined content extraction validation may be performed based on the extracted content of the input image. In the example, the refined content extraction validation may include validating if the extracted content corresponding to a field (the constant field, the discrete field, and the variable field) is with a predefined range, validating the address is a proper address, validating first name or second name, validating consistency in the extracted content.

In an example, the layout validation may include the process of verifying and validating a structural layout and integrity of the document after the extraction of the content from the input image. In the example, the layout validation may include comparing the extracted content with an expected document layout or structure to ensure consistency and the accuracy. In one example, the layout validation may include structure validation. In structure validation, the extracted content may be compared against the expected layout or structure of the document such as checking if the extracted data aligns with the predefined sections, tables, paragraphs, or other structural elements within the document. In one example, the layout validation may include field alignment. In field alignment, the fields (constant field, discrete field, and a variable field respectively) may be checked for proper alignment. In one example, the layout validation may include bounds validation. In bound validation, the position and boundaries of extracted regions may be verified such that the extracted content may fall within the expected regions of the document and does not exceed or overlap with other sections. In one example, the extracted content may be validated for consistency across different pages or instances of the document. In one example, the structure and integrity of an extracted table as part of the extracted content may be verified such as checking for missing rows or columns, ensuring proper alignment of table headers and data, and validating the overall table layout. In one example, the layout validation may include detecting anomalies, missing data, or unexpected variations in the layout.

At step 218, the method 200 may include determining if the validation is successful. The successful validation may indicate that the extracted content is validated successfully on the basis of the image quality validation, the refined content extraction validation, and the layout validation.

At step 220, the method 200 may include classifying the document for the STP if the extracted content is successfully validated corresponding to each of the image quality validation, the refined content extraction validation, and the layout validation. In an example, once the document is classified as the STP document, then the classified STP document may be further stored in the database 106 and/or provided as input to other downstream processes and applications that rely on the extracted content.

At step 222, the method 200 may include classifying the document for the manual annotation i.e., the HITL, if the extracted content is unsuccessfully validated corresponding to at least one of the image quality validation, the refined content extraction validation, and the layout validation. In an example, if one or more of the image quality validation, the refined content extraction validation, and the layout validation may be unsuccessful, then the document may be sent to a user for manually extracting the content.

At step 224, the method 200 may include receiving a correction input based on the manual annotation by the user via a user interface of the client device 104. The correction input may indicate manual content extraction from the input image and storing the manually annotated document in the database 106. In an example, the manually annotated document may be stored as the template dataset in the database 106.

At step 226, the method 200 may include the unified document classifier 102 learning the correction input using a reinforcement learning model. Thus, the unified document classifier 102 may be trained for performing the content extraction from another image similar to the input image using the stored manually annotated document acting as the template.

Figure 3:
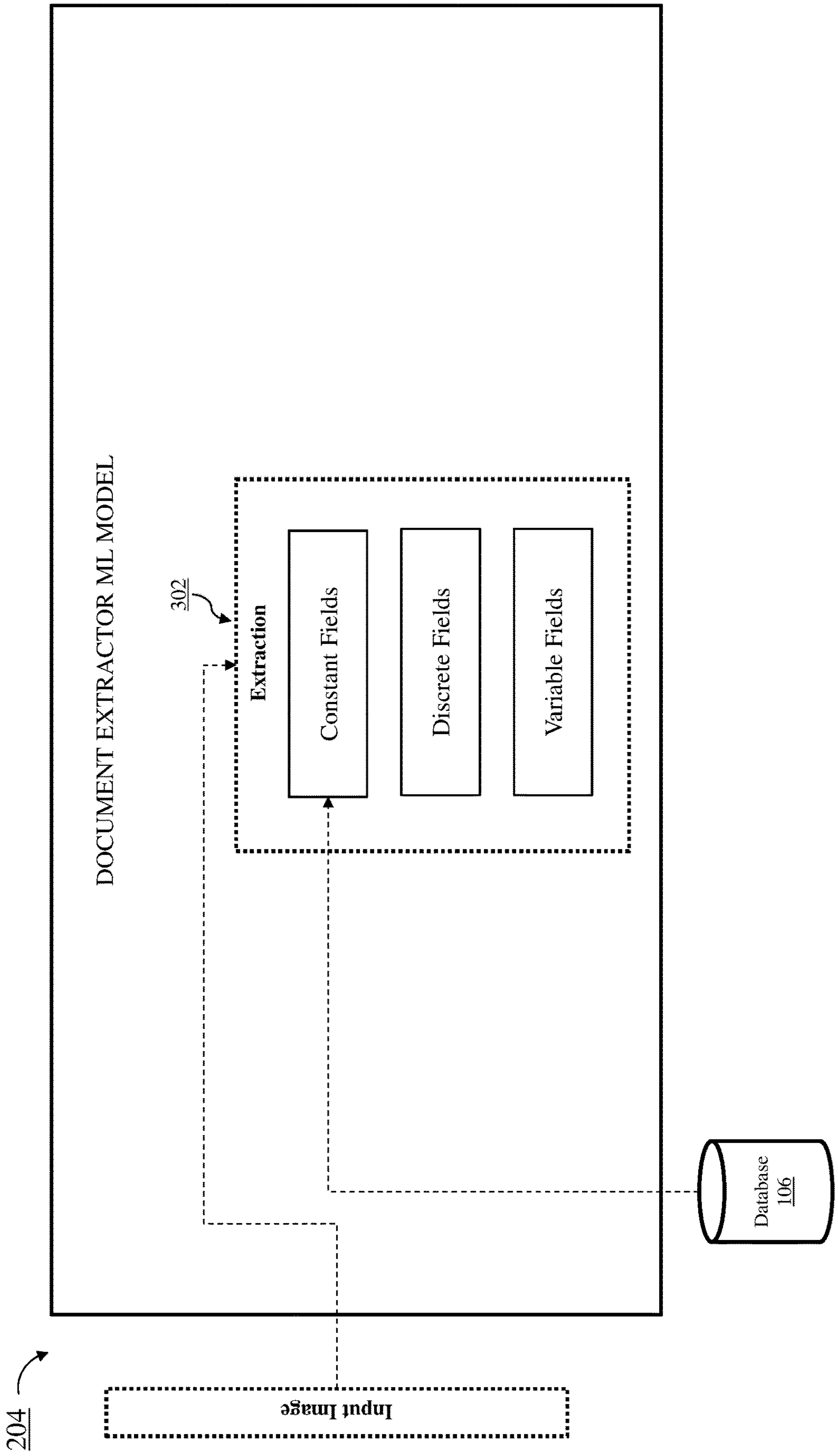
FIG. 3 illustrates a process flow of content extraction from an input image using a document extractor machine learning (ML) model, according to an embodiment of the present disclosure.

FIG. 3 illustrates a process flow comprising sub-steps of the method step 204 for the content extraction from the input image using the document extractor machine learning (ML) model, according to an embodiment of the present disclosure.

In an embodiment, at sub-step 302, the method step 204 may include receiving the input image for extraction of the fields (the constant field, the discrete field, and the variable field). The document extractor ML model may be trained using a few-shot learning technique.

In an embodiment, the document extractor ML model may be trained using a few-shot learning technique to extract a line-item field for table structure coordinates, column mapping, and row splitting from the input image of the document. In an example, the line-item data may include identifying the table coordinates, column coordinates, and row splits in the input image. In one example, the structure of the table remains the same on X-axis while the Y-axis may change for different samples of the template. Similarly, the document extractor ML model may identify the table containing multiple columns which might not be relevant extraction. Thus, the document extractor ML model may identify relevant columns and map them appropriately such that uniform extracted content is sent to the downstream process.

In the embodiment, the document extractor ML model while extracting may identify the rows in the input image of the document using the number of lines and other segregations used in previous occurrences. In one example, row splitting may be performed using the spatial and distance analysis of the content of a specific column for different rows in the selected template from the template dataset. In one example, table structure coordinates and column mapping may be populated from the database 106 using the selected template.

In the embodiment, the document extractor ML model with the few-shot methodology requires very few samples to achieve the content extraction. In an example, the document extractor ML model may perform OCR on the input image and convert the input image into text with co-ordinates. Further, while passing the input image to transformers both text embedding and layout embedding may be used, concatenated with text embedding, and created each for x1, y1, x2, y2, and the embeddings for spatial distance in all directions. Further, the document extractor ML model may include a sequence classification model. In one example, the transformers and BERT base have shared feature extraction layers and the separate heads correspond to multi-modal objectives. The BERT base may have an input sequence length of 512 with 12 encoding layers and a hidden size of 768. The hidden layer for each token is passed to a dense layer of size 768 which is then passed to a softmax layer of output size based on the number of classes.

Figure 4:
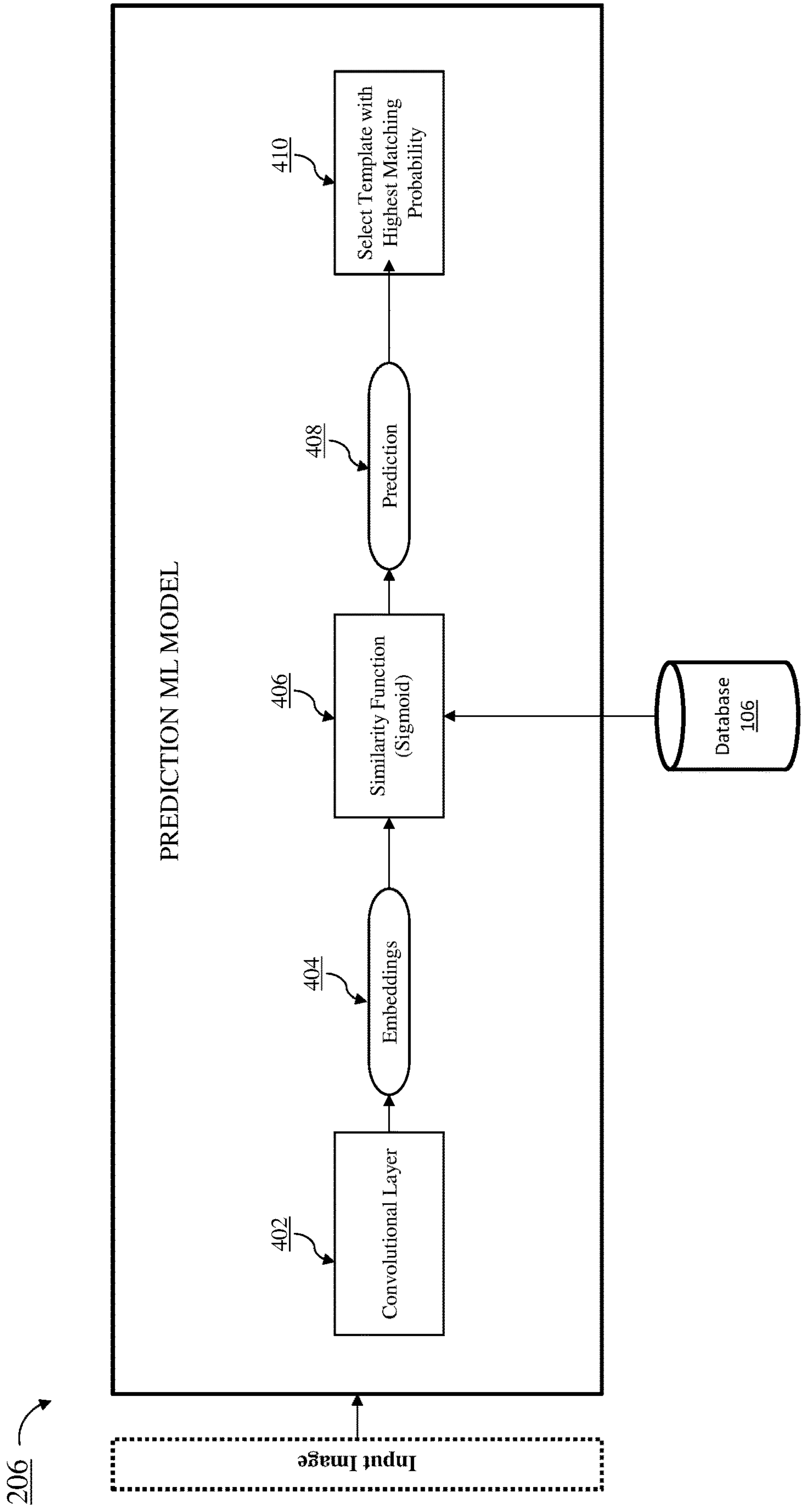
FIG. 4 illustrates a process flow comprising sub-steps of method step of selecting the template using the prediction ML model, according to an embodiment of the present disclosure.

FIG. 4 illustrates a process flow comprising sub-steps of the method step 206 of selecting the template using the prediction ML model, according to an embodiment of the present disclosure.

In an embodiment, at sub-step 402, the method step 206 may include receiving the input image of the document as an input to a convolutional layer of the prediction ML model. Further, the prediction ML model may generate a grayscale version of the received input image. The prediction ML model may determine a number of blank pixels in the grayscale version of the input image. In one example, the number of blank pixels in the grayscale version of the input image may be compared with a threshold pixel count. The threshold pixel count may be computed using the mean of the similarity classifier training images and standard deviation.

At sub-step 404, the method step 206 may include determining convoluted embeddings of the grayscale version of the input image upon determining that the number of blank pixels is above the threshold pixel count. In one example, the convoluted embeddings may indicate one or more features extracted from the convolutional layer. In one example, the input image may be reduced to a new size with a height and width of 28×28 px. Further, the input image and the templates in the template dataset may be passed through two different networks, one for each template. The network may include the convolution layer followed by a max pooling layer twice to get a fully connected network of 120 nodes. Further, a dropout may be applied and finally, a fully connected network of 64 nodes is created. The fully connected layers are then concatenated which makes it to 128 nodes and passed to a sigmoid layer.

At sub-step 406, the method step 206 may include using the sigmoid layer comparing the convoluted embeddings of the grayscale version of the input image with convoluted embeddings of each of the pre-stored templates from the template dataset. The sigmoid layer may return 1 if the template and the input image are similar, and 0 if not similar.

At sub-step 408, the method step 206 may include thus predicting the template similar to the image from the template dataset based on an output of the sigmoid layer.

At sub-step 410, the method step 206 may include selecting the predicted template for the content extraction and classification.

Figure 6:
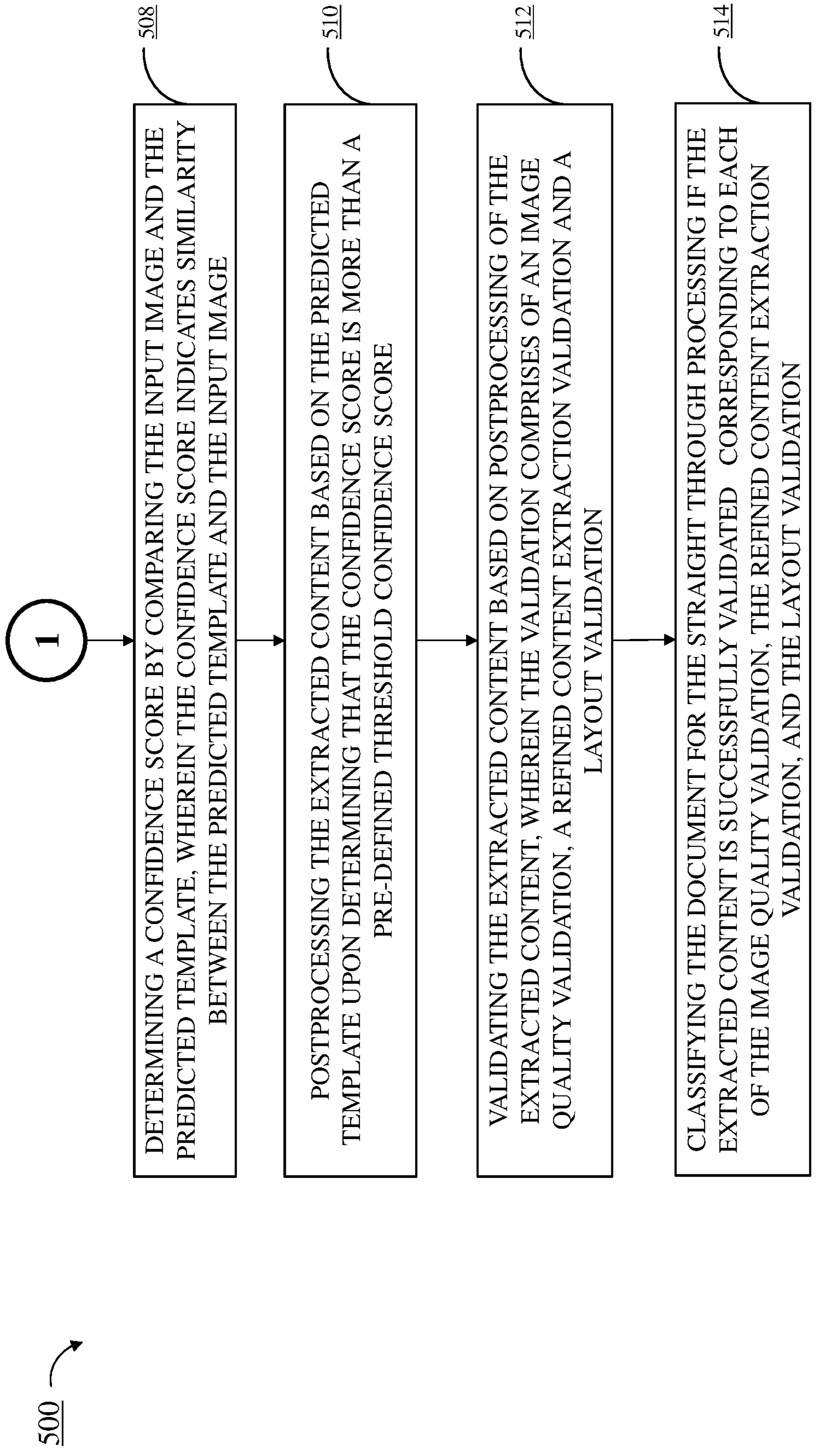
FIG. 6 illustrates another flow diagram depicting a method of classifying the document for the STP using MEM, according to some embodiments of the present disclosure.

FIG. 5-FIG. 6 illustrates another flow diagram depicting a method 500 of classifying the document for the STP using MEM, according to some embodiments of the present disclosure.

At step 502, the method 500 may include receiving, from a storage device, the input image of the document. In one example, the storage device is the database 106.

At step 504, the method 500 may include performing the content extraction from the input image using the document extractor machine learning (ML) model. In one example, the content extraction indicates extracting data from the input image into at least one of a constant field, a discrete field, and a variable field respectively.

At step 506, the method 500 may include selecting the template from the template dataset using the prediction ML model, based on the input image. In one example, the predicted template has the highest matching probability with the input image.

At step 508, the method 500 may include determining the confidence score (CS) by comparing the input image and the predicted template. In one example, the confidence score indicates a similarity between the predicted template and the input image.

At step 510, the method 500 may include post-processing the extracted content based on the predicted template upon determining that the confidence score is more than the pre-defined threshold confidence score.

At step 512, the method 500 may include validating the extracted content based on postprocessing of the extracted content. In one example, the validation comprises the image quality validation, the refined content extraction validation, and the layout validation.

At step 514, the method 500 may include classifying the document for the straight through processing if the extracted content is successfully validated corresponding to each of the image quality validation, the refined content extraction validation, and the layout validation.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be but is not limited to, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform a specific function; software stored on a computer-readable medium; or a combination thereof.

The client device or the computing device as mentioned in the application can include a set of instructions that can be executed to cause the computer system to perform any one or more of the methods disclosed. The computer system may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system can also be implemented as or incorporated across various devices, such as a personal computer (PC), a tablet PC, a personal digital assistant (PDA), a mobile device, a palmtop computer, a laptop computer, a desktop computer, a communications device, a web appliance, a network router, switch or bridge, or any other machine capable of executing a set of instructions (sequential or otherwise) that specify actions to be taken by that machine. Further, while a single computer system is illustrated, the term "system" shall also be taken to include any collection of systems or sub-systems that individually or jointly execute a set, or multiple sets, of instructions to perform one or more computer functions.

The network as referred to in the application may include wired networks, wireless networks, Ethernet AVB networks, or combinations thereof. The wireless network may be a cellular telephone network, an 802.11, 802.16, 802.20, 802.1Q, or WiMax network. Further, the network may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

Figure 7:
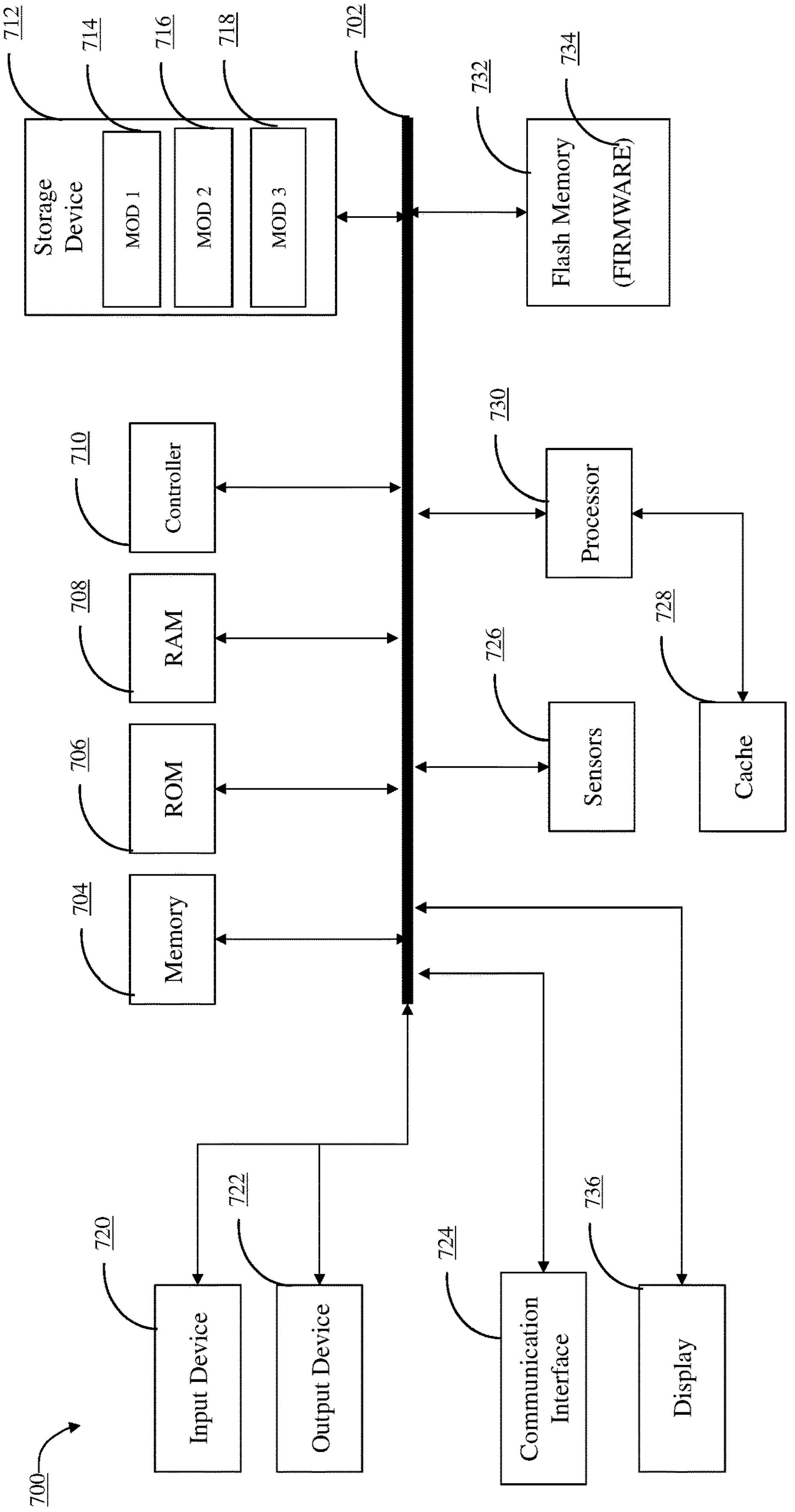
FIG. 7 illustrates an exemplary computer system, according to some embodiments of the present disclosure.

FIG. 7 illustrates an exemplary computing system 700, according to some embodiments of the present disclosure. Each of the components of the computing system 700 is electrically connected or in communication with each other using a system bus 702. The computing system 700 includes a processing unit (CPU or processor) 730, the system bus 702, and a memory 704 including (e.g., read only memory (ROM) 706 and random-access memory (RAM) 708). The system bus 702 couples various system components of the computing system 700 to the processor 730. The computing system 700 may include a cache of high-speed memory connected directly with, in proximity to, or integrated as part of the processor 730. The computing system 700 can copy data from the memory 704 and/or the storage device 712 to the cache 728 for quick access by the processor 730. In this way, the cache 728 may provide a performance boost for processor 730 while waiting for data. These and other modules can control or be configured to control the processor 730 to perform various actions. Other system memories may be available for use as well. The memory 704 may include multiple different types of memory with different performance characteristics. The memory 704 stores instructions to be executed by the processor 730. In some examples, the memory 704 may be considered a non-transitory storage medium. The term "non-transitory" may indicate that the storage medium is not embodied in a carrier wave or a propagated signal. However, the term "non-transitory" should not be interpreted as that the memory 704 is non-movable. In some examples, the memory 704 can be configured to store larger amounts of information. In certain examples, a non-transitory storage medium may store data that can, over time, change (e.g., in Random Access Memory (RAM) or cache). The processor 730 may include any general-purpose processor and a hardware module or software module, such as module 1 714, module 2 716, and module 3 718 embedded in storage device 712. The hardware module or software module is configured to control the processor 730, as well as a special-purpose processor where software instructions are incorporated into the actual processor design. The processor 1130 may essentially be a completely self-contained computing system, containing multiple cores or processors, a bus, a memory controller, a cache, etc. A multi-core processor may be symmetric or asymmetric.

To enable user interaction with the computing system 700, an input device 720 is provided as an input mechanism. The input device 720 can comprise a microphone for speech, a touch-sensitive screen for gesture or graphical input, a keyboard, a mouse, motion input, and so forth. In some instances, multimodal systems can enable a user to provide multiple types of input to communicate with the computing system 700. In this example, an output device 722 is also provided. The communications interface 724 can govern and manage the user input and system output.

Storage device 712 can be a non-volatile memory to store data that is accessible by a computer. The storage device 712 can be magnetic cassettes, flash memory cards, solid state memory devices, digital versatile disks, cartridges, random access memories (RAMs) 708, read only memory (ROM) 706, and hybrids thereof.

The controller 710 can be a specialized microcontroller or processor of the system 700, such as a BMC (baseboard management controller). In some cases, the controller 710 can be part of an Intelligent Platform Management Interface (IPMI). Moreover, in some cases, the controller 710 can be embedded in a motherboard or main circuit board of the computing system 700. The controller 710 can manage the interface between system management software and platform hardware. The controller 710 can also communicate with various system devices and components (internal and/or external), such as controllers or peripheral components, as further described below.

The controller 710 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 710 to initiate or conduct specific hardware recovery procedures or operations, as further described below.

The controller 710 can also include a system event log controller and/or storage for managing and maintaining events, alerts, and notifications received by the controller 710. For example, the controller 710 or a system event log controller can receive alerts or notifications from one or more devices and components and maintain the alerts or notifications in a system event log storage component.

Flash memory 732 can be an electronic non-volatile computer storage medium or chip that can be used by the computing system 700 for storage and/or data transfer. The flash memory 732 can be electrically erased and/or reprogrammed. Flash memory 732 can include EPROM (erasable programmable read-only memory), EEPROM (electrically erasable programmable read-only memory), ROM, NVRAM, or CMOS (complementary metal-oxide semiconductor), for example. The flash memory 732 can store the firmware 734 executed by the computing system 700 when the computing system 700 is first powered on, along with a set of configurations specified for the firmware 734. The flash memory 732 can also store configurations used by the firmware 734.

The firmware 734 can include a Basic Input/Output System or equivalents, such as an EFI (Extensible Firmware Interface) or UEFI (Unified Extensible Firmware Interface). The firmware 734 can be loaded and executed as a sequence program each time the computing system 700 is started. The firmware 734 can recognize, initialize, and test hardware present in the computing system 700 based on the set of configurations. The firmware 734 can perform a self-test, such as a POST (Power-on-Self-Test), on the computing system 700. This self-test can test the functionality of various hardware components such as hard disk drives, optical reading devices, cooling devices, memory modules, expansion cards, and the like. The firmware 734 can address and allocate an area in the memory 704, ROM 706, RAM 708, and/or storage device 712, to store an operating system (OS). The firmware 734 can load a boot loader and/or OS and give control of the computing system 700 to the OS.

The firmware 734 of the computing system 700 can include a firmware configuration that defines how the firmware 734 controls various hardware components in the computing system 700. The firmware configuration can determine the order in which the various hardware components in the computing system 700 are started. The firmware 734 can provide an interface, such as a UEFI, that allows a variety of different parameters to be set, which can be different from parameters in a firmware default configuration. For example, a user (e.g., an administrator) can use the firmware 734 to specify clock and bus speeds; define what peripherals are attached to the computing system 700; set monitoring of health (e.g., fan speeds and CPU temperature limits); and/or provide a variety of other parameters that affect overall performance and power usage of the computing system 700. While firmware 734 is illustrated as being stored in the flash memory 732, a person ordinary skilled in the art will readily recognize that the firmware 734 can be stored in other memory components, such as the memory 704 or ROM 706.

The computing system 700 can include a display 736. The display 736 may be used by the computing system 700 to provide graphics related to the applications that are executed by the controller 710, or the processor 730.

Figure 8:
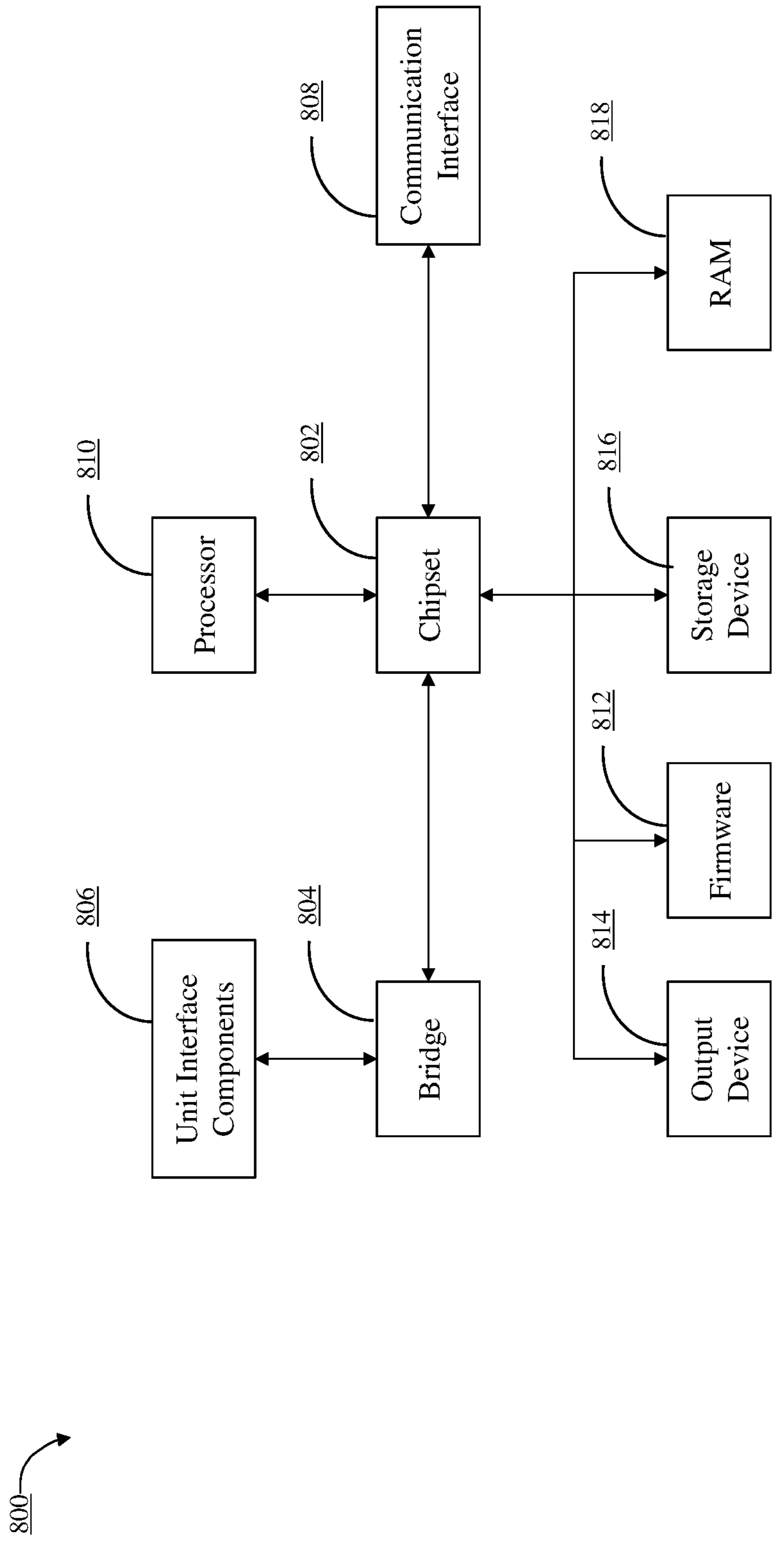
FIG. 8 illustrates another exemplary computer system, according to some embodiments of the present disclosure.

FIG. 8 illustrates another exemplary computer system 800, according to some embodiments of the present disclosure. The system 800 has a chipset architecture that can be used in executing the described method(s) or operations and generating and displaying a graphical user interface (GUI). Computer system 800 can include computer hardware, software, and firmware that can be used to implement the disclosed technology. System 800 can include a processor 810, representative of a variety of physically and/or logically distinct resources capable of executing software, firmware, and hardware configured to perform identified computations. Processor 810 can communicate with a chipset 802 that can control input to and output from processor 810. In this example, chipset 802 outputs information to an output device 814, such as a display, and can read and write information to storage device 816. The storage device 816 can include magnetic media, and solid-state media, for example. Chipset 802 can also read data from and write data to RAM 818. A bridge 804 for interfacing with a variety of user interface components 806 can be provided for interfacing with chipset 802. User interface components 806 can include a keyboard, a microphone, touch detection and processing circuitry, and a pointing device, such as a mouse.

Chipset 802 can also interface with one or more communication interfaces 808 that can have different physical interfaces. Such communication interfaces can include interfaces for wired and wireless local area networks, broadband wireless networks, and for personal area networks. Further, the machine can receive inputs from a user via user interface components 806, and execute appropriate functions, such as browsing functions by interpreting these inputs using processor 810.

Moreover, the chipset 802 can also communicate with firmware 812, which can be executed by the computer system 800 when powered on. The firmware 812 can recognize, initialize, and test hardware present in the computer system 800 based on a set of firmware configurations. The firmware 812 can perform a self-test, such as a POST, on the system 800. The self-test can test the functionality of the various hardware components 802-818. The firmware 812 can address and allocate an area in the RAM memory 818 to store an OS. The firmware 812 can load a boot loader and/or OS and give control of the system 800 to the OS. In some cases, the firmware 812 can communicate with the hardware components 802-810 and 814-818. Here, the firmware 812 can communicate with the hardware components 802-810 and 814-818 through the chipset 802, and/or through one or more other components. In some cases, the firmware 812 can communicate directly with the hardware components 802-810 and 814-818.

It can be appreciated that example systems 800 and 800 can have more than one processor (e.g., 810), or be part of a group or cluster of computing devices networked together to provide greater processing capability. Embodiments of the present disclosure as described in FIG. 1, FIG. 2, FIG. 3, FIG. 4, FIG. 5, and FIG. 6 may be performed using the processor 810. The processor provides a deep-learning model based on memory enabled modelling that is applied to the input image of the document to classify the document as the STP document or non-STP document. The model may be trained using a small number of training samples so as to avoid the constraint of collecting thousands of images. Collecting thousands of images that fit a certain criteria may not always be possible when considering using applications that involve multiple document types or styles. Embodiments of the present disclosure use image enrichment as a processing technique and apply transfer learning by fine-tuning a pre-trained model from CNN. A unified document classification is realized for document images.

The terminology used herein is for the purpose of describing particular embodiments only and is not intended to be limiting to the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art and will not be interpreted in an idealized or overly formal sense unless expressly so defined herein.

While various embodiments of the present disclosure have been described above, it should be understood that they have been presented by way of example only, and not by limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

Although the disclosure has been illustrated and described with respect to one or more implementations, equivalent alterations, and modifications will occur or be known to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

We claim:

1. A method of classifying a document for processing using a memory enabling model, the method comprising:

receiving, from a storage device, an input image of the document;

performing content extraction from the input image using a document extractor machine learning (ML) model, wherein the content extraction indicates extracting data from the input image into at least one of a constant field, a discrete field, and a variable field respectively;

predicting a template from a template dataset using a prediction ML model, based on the input image, wherein the predicted template has highest matching probability with the input image;

determining a confidence score by comparing the input image and the predicted template, wherein the confidence score indicates similarity between the predicted template and the input image;

postprocessing the extracted content based on the predicted template upon determining that the confidence score is more than a pre-defined threshold confidence score;

validating the extracted content based on the postprocessing of the extracted content, wherein the validation comprises an image quality validation, a refined content extraction validation, and a layout validation;

classifying the document for a straight through processing if the extracted content is successfully validated corresponding to each of the image quality validation, the refined content extraction validation, and the layout validation;

classifying the document for a manual annotation, different from the straight through processing if the extracted content is unsuccessfully validated corresponding to each of the image quality validation, the refined content extraction validation, and the layout validation;

receiving a correction input based on the manual annotation, wherein the correction input indicates manual content extraction from the input image;

learning the correction input using a reinforcement learning model; and training the memory enabling model for performing the content extraction from another image similar to the input image using the manually annotated document.

2. The method of claim 1, wherein prior to postprocessing the extracted content:

classifying the document for the manual annotation if the confidence score is less than the pre-defined threshold confidence score.

3. The method of claim 1, wherein the document extractor ML model is trained using a few-shot learning technique.

4. The method of claim 1, wherein predicting the template from the template dataset using the prediction ML model comprises:

generating a grayscale version of the input image;

determining a number of blank pixels in the grayscale version of the input image;

determining convoluted embeddings of the grayscale version of the input image upon determining that the number of blank pixels is above a threshold pixel count, wherein the convoluted embeddings are indicative of one or more features extracted from one or more convolutional layers;

comparing the convoluted embeddings of the grayscale version of the image with convoluted embeddings of each of a plurality of pre-stored templates; and predicting the template similar to the image from the template dataset based on the comparison.

5. The method of claim 4, wherein the prediction ML model is trained using a one-shot detection technique.

6. The method of claim 1, wherein postprocessing the extracted content comprises:

determining data corresponding to the input image into at least one of the constant field, the discrete field, and the variable field based on the predicted template.

7. A system of classifying a document for processing using a memory enabling model, the system comprising:

a memory; and at least one processor communicably coupled to the memory, wherein the at least one processor is configured to:

receive, from a storage device, an input image of the document;

perform content extraction from the input image using a document extractor machine learning (ML) model, wherein the content extraction indicates extracting data from the input image into at least one of a constant field, a discrete field, and a variable field respectively;

predict a template from a template dataset using a prediction ML model, based on the input image, wherein the predicted template has highest matching probability with the input image;

determine a confidence score by comparing the input image and the predicted template, wherein the confidence score indicates similarity between the predicted template and the input image;

postprocess the extracted content based on the predicted template upon determining that the confidence score is more than a pre-defined threshold confidence score;

validate the extracted content based on the postprocessing of the extracted content, wherein the validation comprises of an image quality validation, a refined content extraction validation and a layout validation;

classify the document for a straight through processing if the extracted content is successfully validated corresponding to each of the image quality validation, the refined content extraction validation, and the layout validation;

classify the document for a manual annotation, different from the straight through processing if the extracted content is unsuccessfully validated corresponding to each of the image quality validation, the refined content extraction validation, and the layout validation;

receive a correction input based on the manual annotation, wherein the correction input indicates manual content extraction from the input image;

learn the correction input using a reinforcement learning model; and train the memory enabling model for performing the content extraction from another image similar to the input image using the manually annotated document.

8. The system of claim 7, wherein prior to postprocessing the extracted content, the at least one processor is further configured to:

classify the document for the manual annotation if the confidence score is less than the pre-defined threshold confidence score.

9. The system of claim 7, wherein the document extractor ML model is trained using a few-shot learning technique.

10. The system of claim 7, wherein to predict the template from the template dataset using the prediction ML model, the at least one processor is configured to:

generate a grayscale version of the input image;

determine a number of blank pixels in the grayscale version of the image;

determine convoluted embeddings of the grayscale version of the image upon determining that the number of blank pixels is above a threshold pixel count, wherein the convoluted embeddings are indicative of one or more features extracted from one or more convolutional layers;

compare the convoluted embeddings of the grayscale version of the image with convoluted embeddings of each of a plurality of pre-stored templates; and predict the template similar to the image from the template dataset based on the comparison.

11. The system of claim 10, wherein the prediction ML model is trained using a one-shot detection technique.

12. The system of claim 7, wherein to postprocess the extracted content, the at least one processor is configured to:

extract data associated with the input image into at least one of the constant field, the discrete field, and the variable field based on the predicted template.

* * * * *